(12) United States Patent
Nahidipour

(10) Patent No.: US 9,479,012 B2
(45) Date of Patent: Oct. 25, 2016

(54) PORTABLE DEVICE CAPABLE OF SENSING AN AMOUNT OF WIRELESSLY TRANSFERRED POWER AND OPTIMIZING COIL SELECTION

(75) Inventor: Aram Nahidipour, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1146 days.

(21) Appl. No.: 13/537,970

(22) Filed: Jun. 29, 2012

(65) Prior Publication Data

US 2014/0001874 A1   Jan. 2, 2014

(51) Int. Cl.
| | |
|---|---|
| H01F 27/42 | (2006.01) |
| H01F 37/00 | (2006.01) |
| H01F 38/00 | (2006.01) |
| H02J 17/00 | (2006.01) |
| H02J 7/02 | (2016.01) |

(52) U.S. Cl.
CPC ............... *H02J 17/00* (2013.01); *H02J 7/025* (2013.01)

(58) Field of Classification Search
CPC .......... H02J 5/005; H02J 7/025; H02J 17/00
USPC ........................................................ 304/104
See application file for complete search history.

(56) References Cited

U.S. PATENT DOCUMENTS

| | | | |
|---|---|---|---|
| 2010/0036773 A1* | 2/2010 | Bennett | G06Q 20/3674 705/67 |
| 2010/0277121 A1* | 11/2010 | Hall | B60L 11/182 320/108 |

* cited by examiner

*Primary Examiner* — Carlos Amaya
(74) *Attorney, Agent, or Firm* — Sterne, Kessler, Goldstein & Fox PLLC

(57) ABSTRACT

A mobile device is disclosed that is not only capable of wirelessly receiving power from a source device, but also of wirelessly transmitting power to a destination device. The device includes one or more power modules and corresponding coils for transmitting/receiving signals from which power can be loaded/extracted. In addition, the device can receiving initiation information identifying power transfer standards supported by each of the source and destination devices, and can control its one or more power modules to operate in accordance with the standards identified in the initiation information.

17 Claims, 11 Drawing Sheets

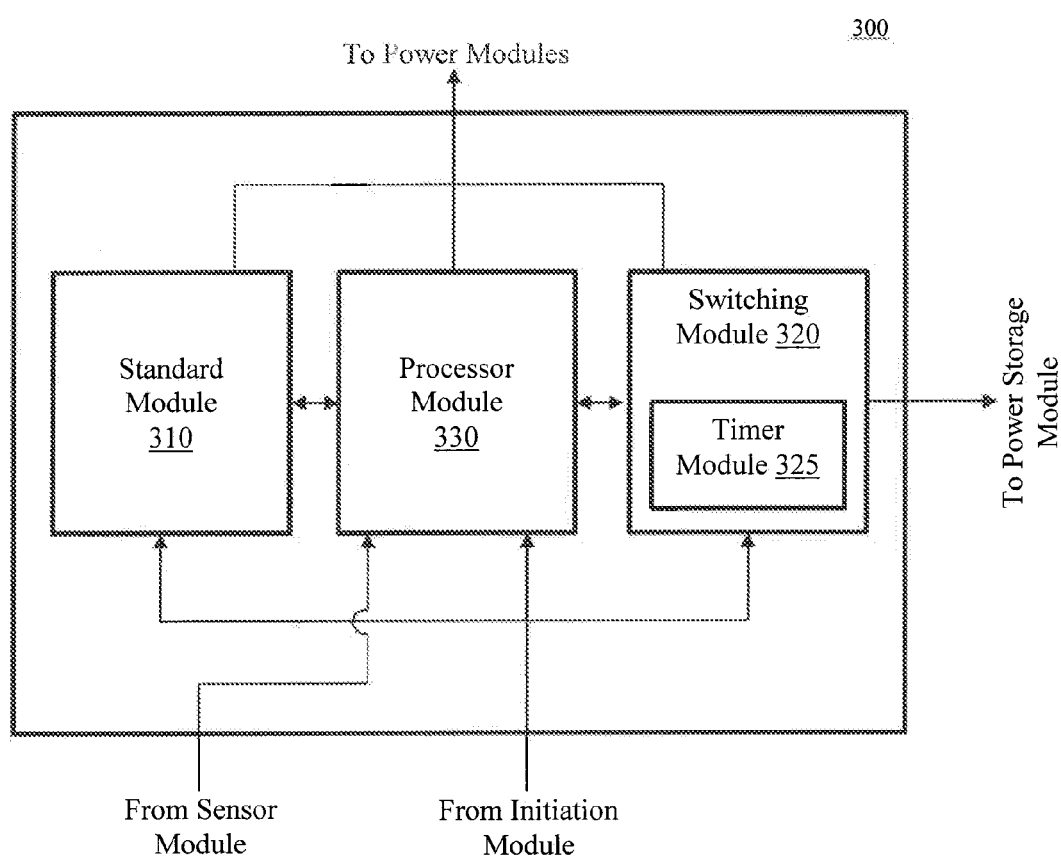

PORTABLE DEVICE CAPABLE OF SENSING AN AMOUNT OF WIRELESSLY TRANSFERRED POWER AND OPTIMIZING COIL SELECTION

BACKGROUND

1. Field of Invention

The disclosure relates to a portable device capable of wireless power transfer, and specifically to a portable device capable of being wirelessly charged and capable of wirelessly charging another device.

2. Related Art

Society's reliance on portable or wireless devices has increased dramatically in recent history. An average person may use several different portable devices in a given day, including cellular telephones, tablet computers, portable gaming devices, digital cameras, and/or video cameras, among others. Each of these devices will typically require its own proprietary charging plug for recharging its battery. This can result in a myriad of different chargers that must be placed throughout a household or swapped in and out of an outlet, which is both inconvenient and cumbersome.

In attempt to overcome these issues, wireless charging pads have recently been commercialized. Wireless charging pads require small modifications to be made to the rechargeable devices (such as the installation of a small coil for power reception) and can then charge the devices using inductive coupling, and without a direct wired connection. Conventional charging pads employ the Qi standard for inductive coupling and wireless charging.

However, conventional wireless charging pads must remain plugged in to a wall outlet to operate. This requires devices that need charging to remain at the location of the charging pad, and they are unable to charge when separated from the charging pad. In addition, as the technology progresses, further charging standards may be employed that renders conventional charging pads obsolete.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

FIG. 3A illustrates a block diagram of an exemplary controller module that may be included in the portable charging device;

DETAILED DESCRIPTION OF THE INVENTION

Figure 1A:
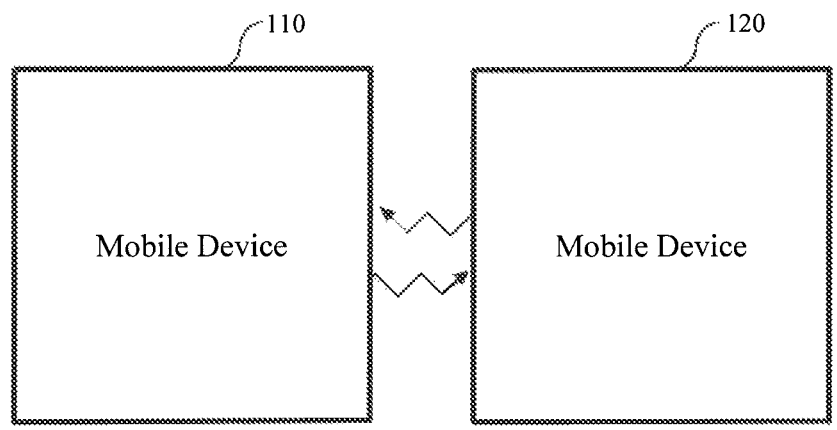
FIG. 1A illustrates a block diagram of an exemplary charging environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many various charging and/or communication methods without departing from the spirit and scope of the present disclosure.

An Exemplary Wireless Communications Environment

FIG. 1A illustrates a block diagram of an exemplary charging environment. As shown in FIG. 1A, a mobile device 120 is capable of wirelessly transmitting power to, and/or wirelessly receiving power from a mobile device 110.

Figure 1B:
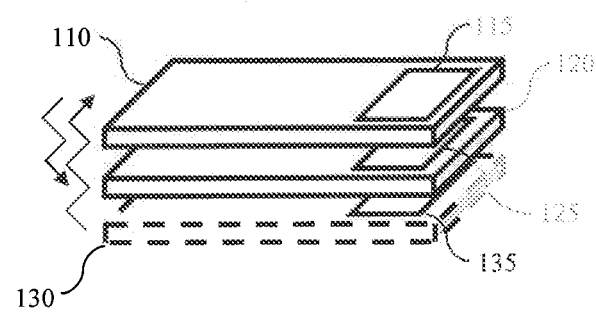
FIG. 1B illustrates a plan view of an exemplary charging environment.

FIG. 1B illustrates a plan view of an exemplary charging environment 100 that also includes a power pad 130 for illustrative purposes (although the power pad 130 may be omitted in many circumstances). Each of the mobile devices 110/120 and the power pad 130 includes a corresponding power module that includes at least one power transfer coil for wirelessly sending and/or receiving power. For example, the mobile device 110 includes a power module 115, the mobile device 120 includes a power module 125, and the power pad 130 includes a power module 135.

By positioning, the devices so as to electrically overlap (electromagnetically coupled) with one another (as shown in FIG. 1B), the power pad 130 is able to wirelessly provide power to the mobile device 120 via the power modules 135 and 125, respectively. Similarly, the mobile device 120 is able to provide power to or receive power from the mobile device 110 via the power modules 125 and 115, respectively.

By providing the mobile device 120 with the abilities to both wirelessly receive and transmit power, a user's charging options become significantly diversified. For example, the mobile device 120 can be manufactured without a power storage device (e.g., a battery). To operate the mobile device 120, the user can simply place the mobile device 120 on the charging pad 130. Additional devices, such as the mobile device 110, can still be charged by being placed on the mobile device 120. Alternatively, even in the absence of the power pad 130, the mobile device 120 can still operate based on power received from mobile device 110.

Alternatively, by providing the mobile device 120 with a power storage device (e.g., a battery), the mobile device 120 can be charged either by the charging pad 130 or the mobile device 110. In addition, the mobile device 120 can function as a portable charging station. Having similarly configured other mobile devices allows for power charge to be seamlessly moved between devices as needed. For example, a person may travel with several mobile devices that each includes their own power storage device. Naturally some of those devices may be used and/or needed much more often than others.

However, while traveling, the accessibility of power can be very limited. By providing each of the mobile devices with the ability to wirelessly transmit and receive power, the user can move power between devices to satisfy his requirements. For example, when his cell phone runs low on power, he can wirelessly move power from a portable gaming device to the battery of the cell phone to ensure that the phone is available for future use until a power outlet is accessible.

First Exemplary Mobile Device

Figure 2A:
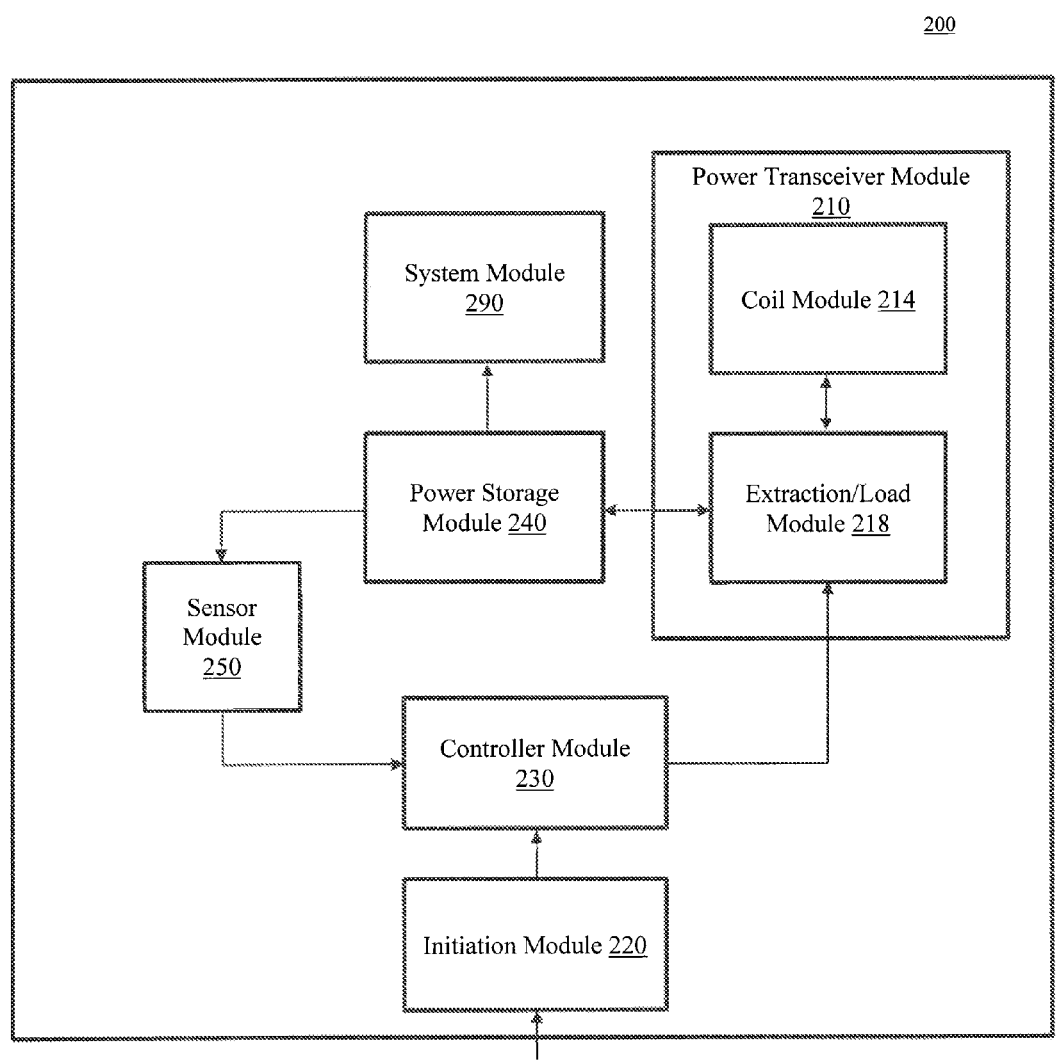
FIG. 2A illustrates a block diagram of an exemplary portable charging device that may be included in the wireless charging environment.

FIG. 2A illustrates a block diagram of an exemplary portable charging device 200 that may be included in the wireless charging environment. The portable device 200 includes a power storage module 240 and a power transceiver module 210. The portable device 200 may represent an exemplary embodiment of the mobile device 120 and the power transceiver module 210 may represent an exemplary embodiment of the power module 125. It should be understood that the portable charging device 200 may be a separate and distinct device, or may be included within any other electronic or other device, including a mobile phone, digital camera, camcorder, portable music player, tablet computer, laptop computer, among others within the spirit and scope of the present disclosure.

The power transceiver module 210 includes a coil module 214 that includes one or more coils for communicating with another power transfer device. Each coil may have a CL circuit configuration, in which a physical coil functions as an inductor and is connected in sees with a capacitor. The power transceiver module 210 also includes an extraction/load module 218 that is connected between the power storage module 240 and the coil module 214. The extraction/load module 218 can extract power from signals received by the coil module 214 to supply to the power storage module and load the coil module 214 with signals to transmit power from the power storage module 240 within signals for charging another device. The extraction/load module 218 may include an inverter for converting outgoing DC signals to AC and a rectifier for converting incoming AC signals to DC.

The power storage module 240 contains one or more power storage devices, such as batteries, capacitors, power cells, etc. The power storage module 240 supplies operating power to a system module 290, which includes the various system components of the device 200 for performing the various device operations. The power storage module 240 is also connected to the extraction/load module 218 of the power transceiver module 210. In this manner, the power storage module 240 can charge based on power wirelessly received by the power transceiver module 210, or can discharge to supply power to the power transceiver module 210 for transmission to an external device.

In an embodiment, the mobile device 200 includes a sensor module 250. The sensor module 250 determines an amount of power received/transmitted by the mobile device 200. In an embodiment, the sensor module 250 monitors the power storage module 240, and detects any change in stored charge. In other embodiments, the sensor module 250 may additionally or alternatively be connected to the power transceiver module 210 for determining an amount of power transmitted/received independent of power consumed by the mobile device 200. The sensor module 250 reports the sensed power amounts to a controller module, such as controller module 230.

The controller module 230 provides control functionality to the power transceiver module 210 based on information received from an initiation module 220 and/or the sensor module 250. The initiation module 220 establishes initial communication with the external device and receives information regarding power transfer parameters associated with the external device. Using these initialization parameters and/or the power amounts detected by the sensing module 250, the controller module 230 controls the operation of the power transceiver module 210. The initiation module 220 may use the same coil 214 for communications, as is used for power transfer, where the communications can be effected using a magnetic field that is generated by the either the coil 214, or by the corresponding coil of the external device.

Device Operation

Power transfer can be initiated via the initiation module 220. For example, the initiation module 220 can communicate with an another external device using any number of short-range communication standards, such as Bluetooth, infrared, near-field communication (NFC), WiFi, USB, SDIO, and/or HF/UHF RDID. When using NFC, for example, the initiation module 220 may use the same coil 214 for communications, as is used for power transfer, where the communications can be effected by a magnetic field that is generated by the either the coil 214, or by the corresponding coil of the external device. Additionally, the initiation module 220 can be configured to extract initiating information transmitted onto the coil module 214, or can be triggered by user inputs.

The initiating information may include direction of power transfer, amount of power to be transferred and/or received, max power charge, and/or power transfer standard, among others. The amount of power to be transferred may be an actual power amount or set based on the relative power levels of the devices. For example, the amount of power to be transferred may be specified based on when the transferring device's remaining power falls below a predetermined threshold or when the receiving device's stored power exceeds a second predetermined threshold. The inputs received from the sensor module 250 can be used by the controller module 230 to determine when these various thresholds have been met.

Once the initiation information has been received, the initiation module 220 forwards the information to the controller module 230. The controller module 230 then controls the operation of the power transceiver module 210 based on the initiation information. For example, the controller module 230 turns on/off the power transceiver module 210 at appropriate times and adjusts the operation of the power transceiver module 210 to operate within the defined power transfer standard, among other control functions as will be discussed in further detail below. Based on the control signals received from the controller module 230, the extraction/load module 218 adjusts its operation accordingly.

Using this configuration, the mobile device 200 is capable of not only wirelessly receiving power, but also of wirelessly transmitting power. In addition, using the initiation information and the controller module 230, the mobile device is extremely versatile and can perform custom power transfers among several various power transfer standards. These power transfer standards can be automatically detected by the mobile device 200 (for example, by reading initiation information stored in the external device using any of the above methods), and the mobile device 200 can automatically switch to a power receive mode when its own stored power falls below a predetermined threshold. Further, power transfer information can be implemented as software, firmware, or stored in memory, and can therefore be updated as new standards arise. As an additional benefit of this versatility, despite having only a single power transceiver module 210, the mobile device 200 can "simultaneously" receive and transmit power, such as to perform power transfer translation, discussed in further detail below.

FIG. 3A illustrates a block diagram of an exemplary controller module 300 that may be included in the portable charging device. The controller module includes a standard module 310 and a switching module 320, and may represent an exemplary embodiment of the controller module 230.

The controller module 300 receives initiation information from the initiation module 220. The standard module 310 selects the standard to be used by the power transceiver module 210 based on the initiation information. The switching module 320 controls the power transfer of the power transceiver module 210. For example, the switching module 320 initiates and terminates power transfer of the power transceiver module 210 and/or direction of transfer. The switching module 320 includes a timer module 325 for use in certain circumstances. The controller module 300 also includes a processor module 330 to coordinate control between the standard module 310 and the switching module 320, as well as to perform general control operations. Detailed functionality of the controller module 300 can be understood from the following example.

As discussed above, the mobile device 200 can perform "simultaneous" power receipt and transmission. In order to do so, the controller module 300 receives initiation information that identifies a first device from which the mobile device 200 can receive power as well as a second device that requires power. The initiation information also includes standard information of these two devices.

Based on the standard information, the standard module 310 selects control information for controlling the operation of the power transceiver module 210 within the parameters of the corresponding standards. Because the mobile device 200 only includes a single power transceiver module 210, it cannot perform true simultaneous power transfer. Therefore, the switching module 320 performs coordinated switching between the two external devices to move power.

For example, after receipt of the initiation information, the switching module 320 turns on the power transceiver module 210 into a receive mode. During this period, the power transceiver module 210 receives power from the first external device in accordance with the first standard set by the standard module 310, where the received power is stored in storage module 310 (e.g. battery or one or more capacitors). Meanwhile, the timer module 325 of the switching module tracks an amount of time the power transceiver module 210 is in the receive mode. Once that time exceeds a predetermined threshold, the switching module 320 controls the power transceiver module 210 to switch from the receive mode to a transmit mode. The predetermined threshold should be set to be sufficient to receive a significant amount of power from the first external device, but short enough such that the second external device does not sit for long periods without receiving a charge.

Once the switching module 320 initiates the switch from the receive mode to the transmit mode, the switching module 320 informs the processor module 330. The processor module 330 coordinates the switch with the standard module 310, which provides the standard information to the power transceiver module 210. Therefore, at the time of the switch, the power transceiver module 210 transitions from receiving power in accordance with the first power transfer standard to transmitting power within the parameters of the second power transfer standard. Again, the time module 325 tracks the amount of time before initiating a switch back to the receive mode.

In an embodiment, the switching may occur based on an amount of power received from the source device and/or transmitted to the destination device. In this instance, rather than using the timer module 325, the processor module 330 of the controller module 300 instructs the switching module 320 to switch based on the information received from the sensor module 250 indicating the amount of power received/transmitted. The receive threshold may be the same as, or different from, the transmit threshold.

Employing this switching technique, the controller module 300 controls the operation of the power transceiver module 210 so as to perform substantially simultaneous receiving and transmitting. It should be noted that the above example is meant to illustrate detailed functionality of the controller module. However, several aspects may not be required, or may be modified. For example, simultaneous reception/transmission may not be necessary in some circumstances, at which time only reception or transmission will be needed. In that instance, the switching module 320 can be used only to control the power transceiver module 210 to turn on after receipt of the initiation information, and to turn off after a predetermined amount of power has either been received (if in receive mode) or transmitted (if in transmit mode) based on the information received from the sensor module 250. In other words, the controller module enable power transfer to the destination device until a desired amount of power is transmitted.

Second Exemplary Mobile Device

Figure 2B:
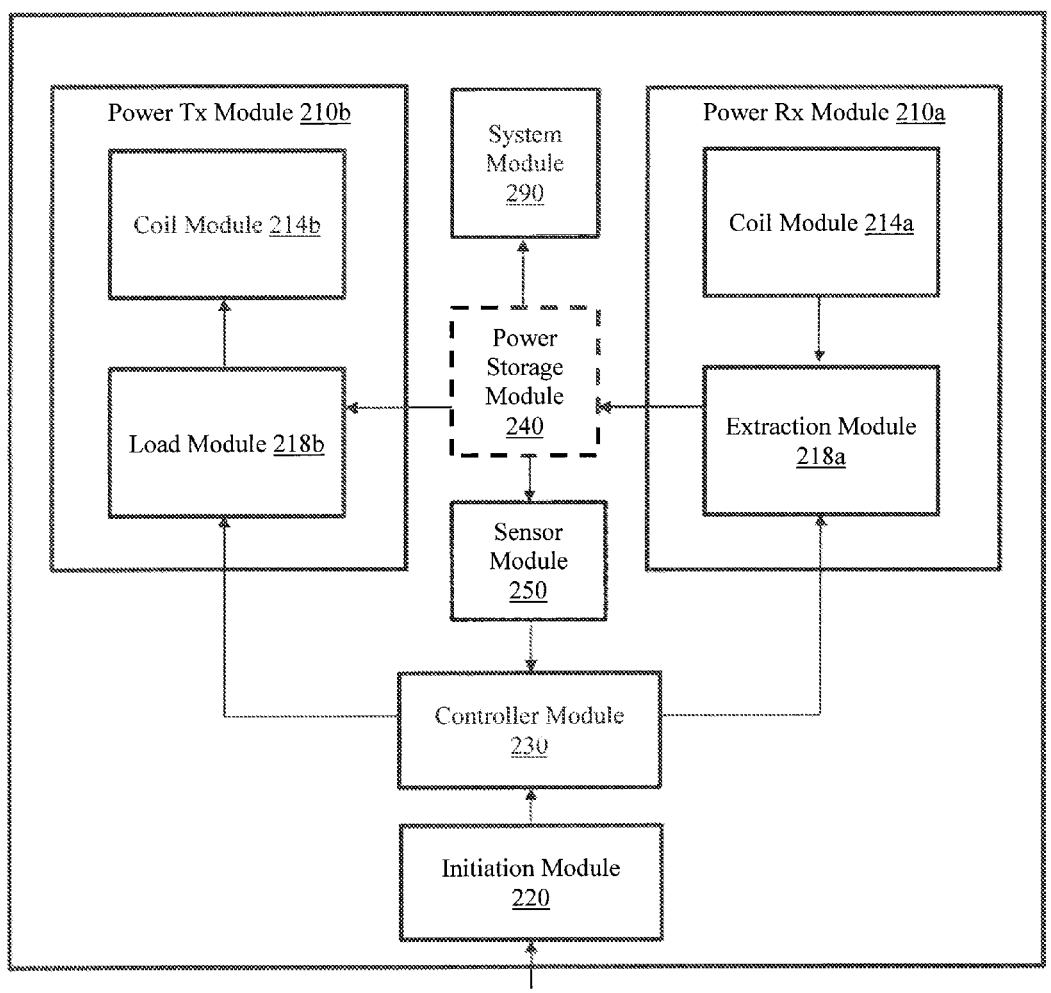
FIG. 2B illustrates a block diagram of an exemplary portable charging device that may be included in the wireless charging environment.

FIG. 2B illustrates a block diagram of a second exemplary portable charging device 201 that may be included in the wireless charging environment 100. The mobile device 201 includes a power receiver module 210a and a power transmission module 210b, which may together act as a power transceiver module 210. The second exemplary portable charging device 201 is substantially similar in configuration and operation to the portable charging device 201 shown in FIG. 2A. Therefore, for purposes of this discussion, the second exemplary device will only be described to the extent that it differs from the first exemplary device.

Unlike the mobile device 200, which only includes a single power transceiver module 210 for both power reception and transmission, the mobile device 201 includes a power receiver module 210a and a power transmission module 210b. The power reception module 210a includes a coil module 214a and an extraction module 218a, and is designated for wirelessly receiving power transmission signals from an external device. The coil module 214a includes one or more coils to receive the wireless signals from the environment, and the extraction module 218a extracts power from the received signals. The coil modules 214a and 214b may each have a CL circuit configuration in which their respective physical coils function as inductors connected serially with corresponding capacitors. In an embodiment, the coil modules 214a and 214b are primary and secondary coils of a single coil array. Further, the extraction module may include one or more rectifiers for converting receive AC signals to DC, for storage in power storage module 240.

Similarly, the power transmission module 210b includes a coil module 214b and a load module 218b, and is designated for wirelessly transmitting power transmission signals to one or more external devices. The load module 218b generates power transmission signals, which it loads onto the coil module 214b. The load module 218b may include one or more inverters for converting DC energy to AC for wireless signal transmission. The coil module 214 includes one or more coils for wirelessly transmitting the power transmission signals to the environment.

The mobile device 201 may optionally include a power storage module 240. As previously discussed, power storage modules (e.g., batteries, etc.) comprise a significant portion of portable device weight. Therefore, by excluding the power storage module 240, the device becomes extremely light and can operate solely based on power received by the power receiver module 210a. As an alternative, or in addition to a battery, the storage module 240 may include one more parasitic capacitors to temporarily store charge. In addition, the mobile device may still be capable of charging other devices. For example, the power transmission module 210b can use the power received by the power receiver module 210a to wirelessly transfer to another device.

Device Operation

The mobile device 201 operates in substantially the same manner as the mobile device 200, with some small alterations due to the use of two distinct power modules 210.

The controller module 230 receives initiation information from the initiation module 220, which it uses to configure the power receiver module 210a and the power transmission module 210b. The controller module 230 can have the configuration shown in FIG. 3A, or a similar configuration. For example, based on the initiation information, the switching module 320 can control one or both of the power modules 210 to turn on. Similarly, the standard module 310 provides standard information to each of the power modules to control the power reception and power transmission within standards associated with their corresponding external devices.

In the case where the mobile device 201 is only receiving power, the controller module 230 controls the power receiver module 210a to be in an ON state and controls the power transmission module 210b to be in an OFF state. The extraction module 218a extracts power from signals received by the coil module 214a using the standard defined by the controller module 230, and supplies the extracted power to the power storage module 240 (if available), or directly to the system module 290, for system operation. The input received from the sensor module 350 can be used to determine when the mobile device 201 has received sufficient power.

In the case where the mobile device 201 is both to receive and transmit power, the controller module 230 receives initiation information indicating the presence of the source device (device providing power to the mobile device 201) and destination device (device to receive power from the mobile device 201). In an embodiment, the controller module 230 can automatically sense and negotiate the standard information of the source and destination devices. The controller module 230 controls both the power receiver module 210a and the power transmission module 210b to be in an ON state. The extraction module 218a extracts power from signals received by the coil module 214a using the standard associated with the source device.

Because the power transfer system is substantially independent of the system module 290 that controls the device functionality, the motile device 201 is capable of performing power transfer operations regardless of whether the mobile device 201 is in an operating state. If the mobile device 201 is in an operating state, the power receiver module 210a transfers the extracted power both to the system module 290 (via the power storage module 240, if available) and the power transmission module 210b (via the power storage module 240, if available). Alternatively, if the mobile device 201 is not in the operating state, the power receiver module 210a transfers the extracted power only to the power transmission module 210b (via the power storage module 240, if available).

The load module 218b generates power transmission signals based on the standard associated with the destination device using the power received from the power receiver module 210a. The load module 218b loads the coil module 214b with the generated signals, which are then transmitted to the environment for receipt by the destination device.

Using two or more distinct power modules, the mobile device 201 can simultaneously perform power reception and transmission. In addition, the mobile device 201 can perform these operations while simultaneously charging its own power storage module 240 or power its own system module 290. In addition, the mobile device 201 can be configured without its own internal power storage module 240, and can still power its own system module 290 and charge additional external devices. In an embodiment, the internal power storage module 240 can employ intrinsic capacitance or other temporary charge holding device.

Translation of Power Transfer Standards

In an embodiment, the mobile device 201 may operate as a translation device between two devices capable of wireless power transmission. For example, the source device may only be capable of wirelessly transmitting power using one or more transmission standards that the destination device does not support. Therefore, the source and destination devices are incompatible with each other and cannot directly wirelessly share power. However, using the mobile device 201, the source device would be able to wirelessly transmit power to the destination device indirectly via the mobile device 201.

In particular, the controller module 230 would control the power receive module 210a to receive power from the source device in accordance with a supported standard of the source device based on the initiation information. The controller module 230 would then control the power transmission module 210b to transmit the power (received from the power source device) to the destination device using a supported standard of the destination device based on the initiation information. In this manner, the mobile is capable of facilitating wireless power transfer between devices that would otherwise be unable to wirelessly transfer power to each other.

Exemplary Billing Configuration

Figure 3B:
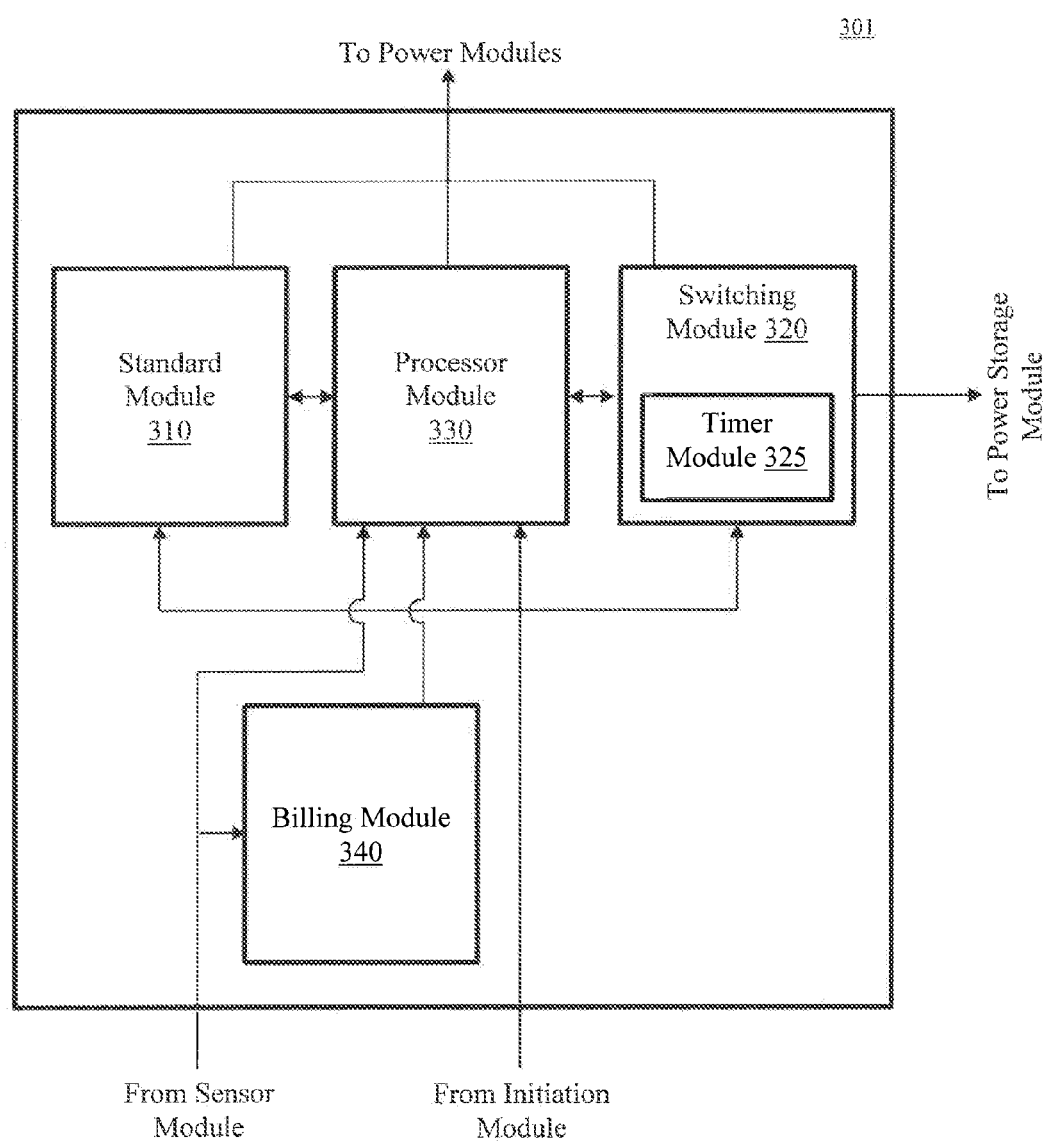
FIG. 3B illustrates a block diagram of an exemplary controller module that may be included in the portable charging device.

FIG. 3B illustrates a block diagram of an exemplary controller module 301 that may be included in the portable charging device. The controller module 301 includes a billing module 340, and may represent an exemplary embodiment of the controller module 230.

With the versatility of the disclosed mobile charging device, it becomes easy not only to transfer power among a user's own devices, but also from the user to a third person. For example, a friend, relative, or stranger whose phone or other device has run low on power may request wireless power transfer from one of the user's devices. However, if the user agrees to transfer power, the user must either absorb the cost of the power or request reimbursement from the recipient for an unknown cost of the power transferred.

Therefore, the controller module 301 includes a billing module 340. As discussed above, the sensor module 250 is capable of sensing an amount of power received and/or transferred by the mobile device 200/201. The sensor module 250 provides the sensed amount of transferred power to the billing module 340. The billing module 340 may be programmed with a cost rate at which electrical power is currently worth, and may be programmable to update this value periodically via an internet and/or satellite connection.

The billing module 340 can calculate the cost of the power transferred from the information received from the sensor module 250 and the cost rate as, for example, cost_of_transferred_power=amount_of_power_transferred* cost_rate. The amount_of_power_transferred can be based on the amount of power discharged from the user's device (representing the cost to the user) or based on the amount of power estimated to be received by the recipient (representing the benefit to the recipient) based on user preferences.

Once the cost_of_transferred_power has been determined, the billing module 340 can initiate a billing process to actually charge the cost to the recipient. For example, using the wireless communication structure employed for receipt of the initiation information (e.g., NFC, infrared, RF, etc.), the billing module 340 can acquire credit card information, bank account information, or other electronic payment information (e.g., paypal, etc.) to transfer funds corresponding to the calculated cost of the transferred power from the recipient to the user. In an embodiment, the billing information is acquired prior to transferring power, and the recipient is charged after the power has been transferred.

In this manner, the user is able to transfer power for his devices to others, without having to absorb the costs associated with the power provided.

Figure 4:
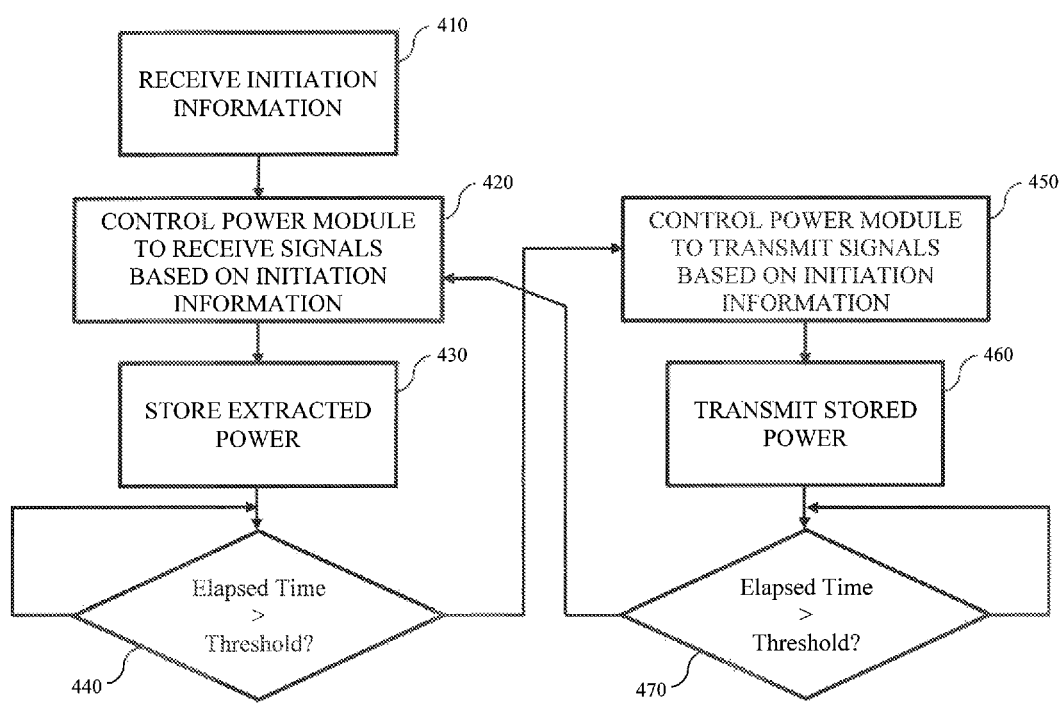
FIG. 4 illustrates a block diagram of an exemplary method for wirelessly transferring power from a first external device to a second external device by a device having a single coil module.

Exemplary Method of Wirelessly Transferring by a Device Having a Single Coil Module FIG. 4 illustrates a block diagram of an exemplary method for wirelessly transferring power from a first external device to a second external device by a device having a single coil module. It will be understood from the following description how to also only receive power or only transmit power.

Initially, the device receives initiation information (410). The initiation information identifies the presence of a source device and/or destination device and certain parameters, such as transfer standards, associated with each of those devices. The present of the devices and their parameters can be auto-detected in an embodiment. Based on the initiation information, the device controls its power transceiver module to receive power signals from the source device in accordance with a standard associated with the source device (420). After receiving the signals, the device extracts power from the received signals and stores this extracted power (430).

The device continues to extract power from received signals received from the source device for some predetermined time duration. The device tracks whether this duration has concluded by comparing an elapsed time to a predetermined threshold (440). While the elapsed time is less than the threshold (440—N), the elapsed time continues to ran and the device continues to extract power from received signals. When the elapsed time exceeds the threshold (440—Y), the device controls the power transceiver module to stop receiving signals, and to instead transmit power signals to the destination device (450).

Once switched to transmission, the device transmits stored power via wireless signals to the destination device (460). As with the receive operation, the device continues the transmission operation for some predetermined duration. This duration may be the same as, or different from, the duration associated with receiving signals. For example, if the device is also running its own system, it may be beneficial for the receive mode to have a duration that exceeds the duration of the transmission mode.

The device again tracks whether the duration has elapsed by comparing an elapsed time to a threshold (470). If the elapsed time is less than the threshold (470—N), the device continues tracking the elapsed time and transmitting power signals to the destination device. If the elapsed time exceeds the threshold (470—Y), the device switches the power transceiver module back to receive mode (420). The device cycles in this manner until it receives some interrupt from the environment, such as a power-off signal, loss of connection to either the source or destination device, or notification from either of the source or destination device that no more power can/needs be transferred. In an embodiment, the elapsed time can be set based on a predetermined transfer limit or price limit (based on the cost of the power transferred). In addition, rather than tracking time, the amount of power transferred can be tracked and compared to either the transfer or price limits.

Those skilled in the relevant art(s) will recognize that the above method can additionally or alternatively include any of the functionality of the mobile device 200/201 discussed above, as well as any of its modifications. Further, the above description of the exemplary method should neither be construed to limit the method nor the description of the wireless communication device 200/201.

Figure 5:
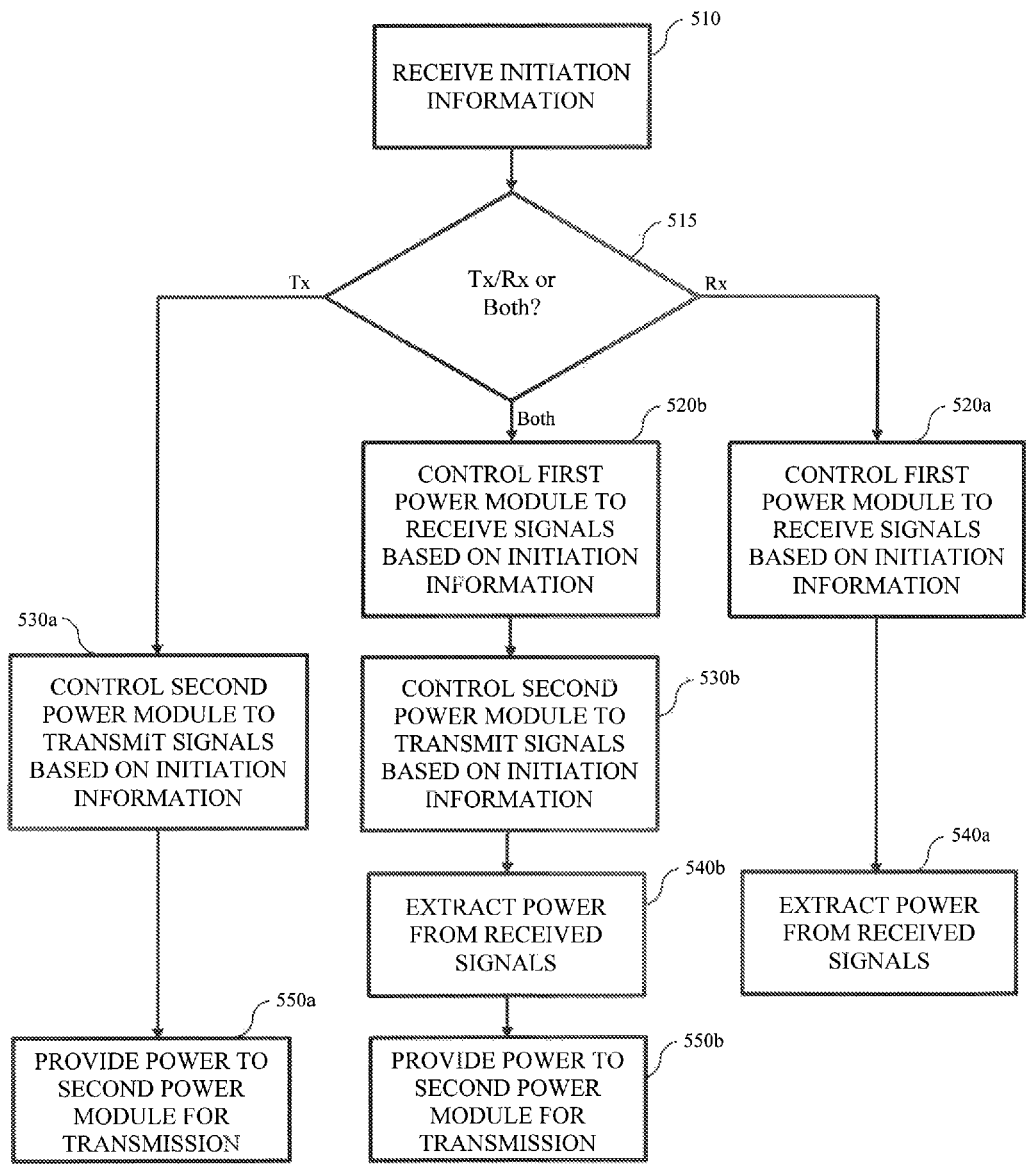
FIG. 5 illustrates a block diagram of an exemplary method for wirelessly transferring power from a first external device to a second external device by a device having multiple coil modules.

Exemplary Method of Wirelessly Transferring by a Device Having Multiple Coil Modules FIG. 5 illustrates a block diagram of an exemplary method for wirelessly receiving power from a first external device and/or wirelessly transmitting power to a second external device by a device having multiple coil modules.

The device begins by receiving initiation information (510). The initiation information identifies the presence of a source device and/or destination device and certain parameters, such as transfer standards, associated with each of those devices. Based on the initiation information, the device determines whether it should perform power transfer, power reception, or both (515). If the device determines that it should perform wireless transmission only (515—Tx), the device controls a second power module to transmit signals to a destination device based on the initiation information (530a) in accordance with the standard associated with the destination device and provides power to the second power module for transmission (550a).

If, on the other hand, the device determines that it should perform power reception (515—Rx), the device controls a first power module to receive signals from a source device based on the initiation information (520a) in accordance with a standard associated with the source device and extracts power from those received signals (540a) to provide to its power storage module or other electrical components.

Finally, if the device determines that it should perform both power reception and transmission (for example, in the case of performing power transfer standard translation), the device controls the first power module to receive power signals from the source device in accordance with the standard associated with the source device (520b). At the same time, the device controls a second power module to transmit power signals to the destination device (530b).

After receiving the signals via the first power module, the device extracts power from the received signals (540b). This extracted power can be stored in a power storage device, or provided directly to the second power module and/or system devices. The power sent to the second power module is then transmitted to the destination device (550b).

Those skilled in the relevant art(s) will recognize that the above method can additionally or alternatively include any of the functionality of the mobile device 200/201 discussed above, as well as any of its modifications. Further, the above description of the exemplary method should neither be construed to limit the method nor the description of the mobile device 200/201.

Exemplary Method for Billing for Transferred Power

Figure 6:
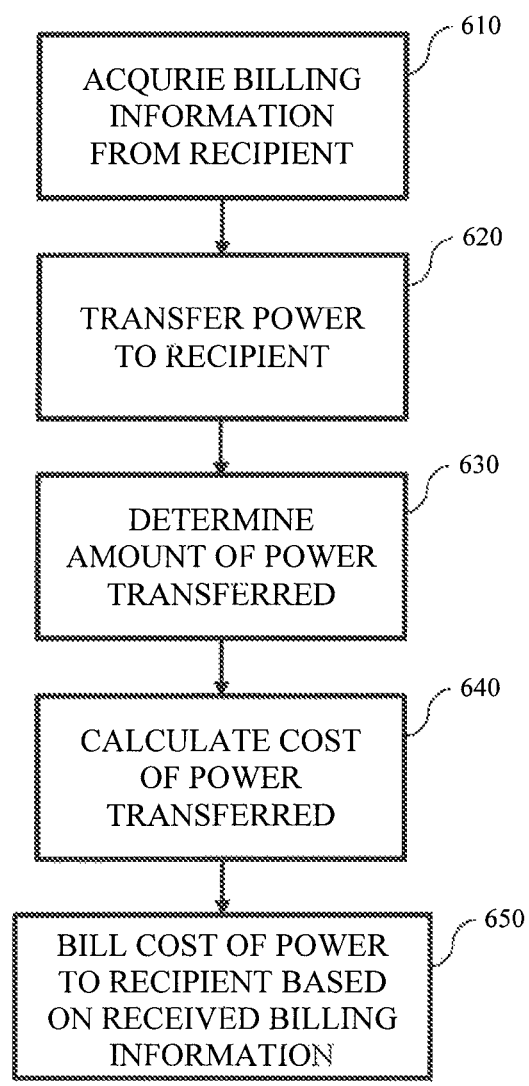
FIG. 6 illustrates a block diagram of an exemplary method for billing a recipient for wirelessly transferred power received by that recipient.

FIG. 6 illustrates a block diagram of an exemplary method for billing a recipient for wirelessly transferred power received by that recipient. For illustrative purposes, the description below is made from the perspective of a source device transferring power to a destination device. However, it will be understood that a similar (but reversed) method would be applicable from the perspective of the destination device receiving power from the source device.

The source device initially acquires billing information from the destination device (610). This information may be included within the initiation information and should include information sufficient to facilitate a transfer of funds from a user of the destination device to the user of the source device. In an embodiment, the billing information includes an amount of the payment to be made, which may dictate the amount of power to be transferred.

Once the billing information has been received by the source device, the source device proceeds to transfer power to the destination device (620). During power transfer, the source device detects an amount of power transferred to the destination device (630). This can be performed by a sensor module configured to detect the amount of power transmitted. The amount of power transferred may dictate whether power transfer should continue or stop. In an embodiment, power transfer continues until a desired amount of power is transferred.

Based on the detected amount of power transferred, the source device calculates a cost associated with the transferred power (640). The cost can be calculated based on a unit cost of power that is programmed into the source device or retrieved from the internet or other service. Once the power transfer is complete, the source device then initiates a transfer of funds from the user of the destination device to the user of the source device using the billing information previously acquired (650).

Those skilled in the relevant art(s) will recognize that the above method can additionally or alternatively include any of the functionality of the mobile device 200/201 discussed above, as well as any of its modifications. Further, the above description of the exemplary method should neither be construed to limit the method nor the description of the mobile device 200/201.

Exemplary Coil Locations and Selections

As devices become more portable, and people become more mobile, it becomes necessary to have device charging capabilities away from home. In most instances, this problem has been addressed by the use of chargers specifically designed for cigarette-lighter style electrical outlets within motor vehicles and/or USB chargers that are connectable with computers or other electronic devices. However, all of these options require the user to travel with a device charger. This becomes particularly cumbersome when traveling with multiple devices, as each will typically require its own charger.

Therefore, in an embodiment, charging stations can be built into different vehicles to facilitate easy availability of power for traveling users. For example, coil modules may be built into a glove compartment, console, dashboard, and cupholder, among others, of a motor vehicle. These coil modules can be connected with the vehicle's power supply (e.g., car battery) to provide power to the user's devices while traveling in the car. Similarly, coil modules may be built into airline seatback trays, armrests, etc., and connected with the airplane's electrical generator. In this manner, people traveling with portable devices can always have easy access to additional power.

In an embodiment, the coil module contained within the vehicle may be contained within a Faraday cage to prevent the leakage of radio waves from the immediate vicinity of the coil module. This prevents a person's use of the public coil module from offending other users who are fearful of such radiation.

The ease with which the disclosed mobile devices are capable of transferring power also allows for several additional uses. Specifically, because the mobile devices are capable of wirelessly providing power to other devices, they can be utilized in a multitude of new ways. For example, a car whose battery has died may be able to acquire charge from a mobile device sufficient to start the engine. In another example, by attaching the mobile device to a stroller or bicycle (at a position of a coil module thereon), the mobile device can supply power for a light, music box, speedometer, etc. In another example, a runner can place the mobile device in a pocket having a coil module in order to power a light, OPS, etc. In addition, because these devices can all receive power from the mobile device, they won't require their own power source, which reduces their size, cost, and environmental effect. Those skilled in the relevant art(s) will recognize that many additional uses may also be available within the spirit and scope of the present disclosure.

As is known in the art, the efficiency in the power transfer from one device to another often depends on the orientation of the coil module in the charging device with that of the recipient device. While in the home (or other stationary location), it is relatively easy to ensure a proper alignment. However, in instances where the coil module is placed within a moving vehicle, the motion of the vehicle may cause the recipient device to shift with respect to the coil module of the charging device.

Figure 7:
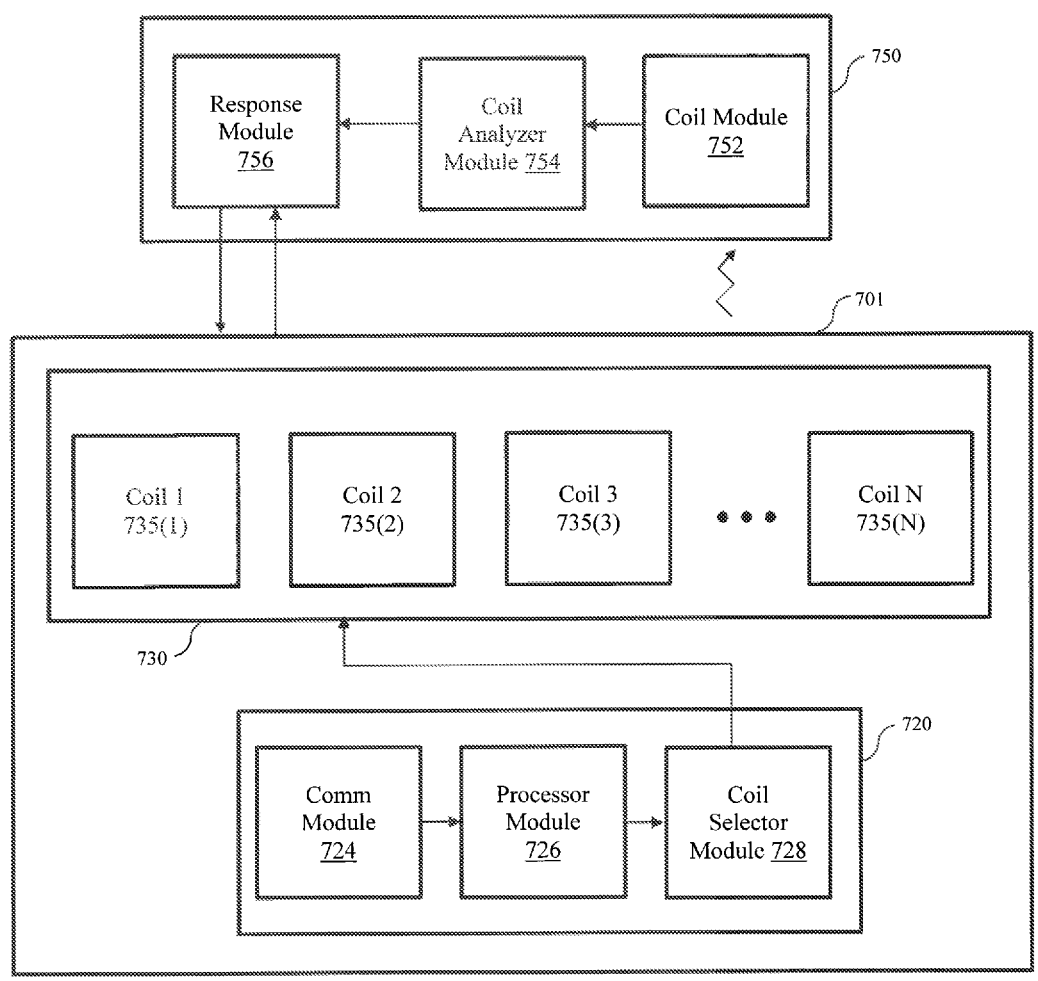
FIG. 7 illustrates a block diagram of charging station and mobile device capable of selecting an optimal coil for power transmission.

FIG. 7 illustrates a block diagram of charging station 701 and recipient device 750 capable of selecting an optimal coil for power transmission. The charging station 701 includes a coil module 730 that includes a plurality of coils 735, and may represent an exemplary embodiment of the mobile device 200/201.

The coil module 730 contains N coils (735(1)-735(N)), each of which having a different orientation. When a recipient device 750 is placed on the charging device 701 to receive power, the recipient device may be aligned with any one of the coils 735. In other words, one or more coils may have a stronger magnetic coupling than the others. Therefore, a coil selector module 728 of the controller module 720 selects each of the coils 735 in sequence for power transmission to determine which one as the strongest coupling.

For each of the selected coils 735, the coil module 752 of the recipient device receives power signals. While receiving the power signals, a coil analyzer module 754 analyzes the strength of the received signals and the power extracted from those signals, and forwards the results to the response module 756. The scan may be coordinated between the two devices during an initiation stage, as may be set by a standard, etc. From the analysis, the response module 756 transmits a response signal to the charging device 701 that indicates the coil 735 having the preferred power transmission characteristics. In an embodiment, the response signal may include characteristics or statistics of the trial period (e.g., sequential transmission over each of the coils), and the preferred coil can be determined by the processor module 726 based on this information.

This response signal is received by the communication module 724 that is coupled to the processor module 726. The processor module 726 processes the response signal and determines the coil identified by the recipient device 750. The processor module 726 forwards this information to the coil selector module 728, which proceeds to select the coil module 735 that has the preferred power transmission characteristics as identified by the recipient device 750.

As discuss above, continuous motion of the vehicle will continue to reposition the device over time. Therefore, in order to maintain strong power transmission connections, the above process may be repeated periodically.

Exemplary Method for Optimizing Power Transfer

Figure 8:
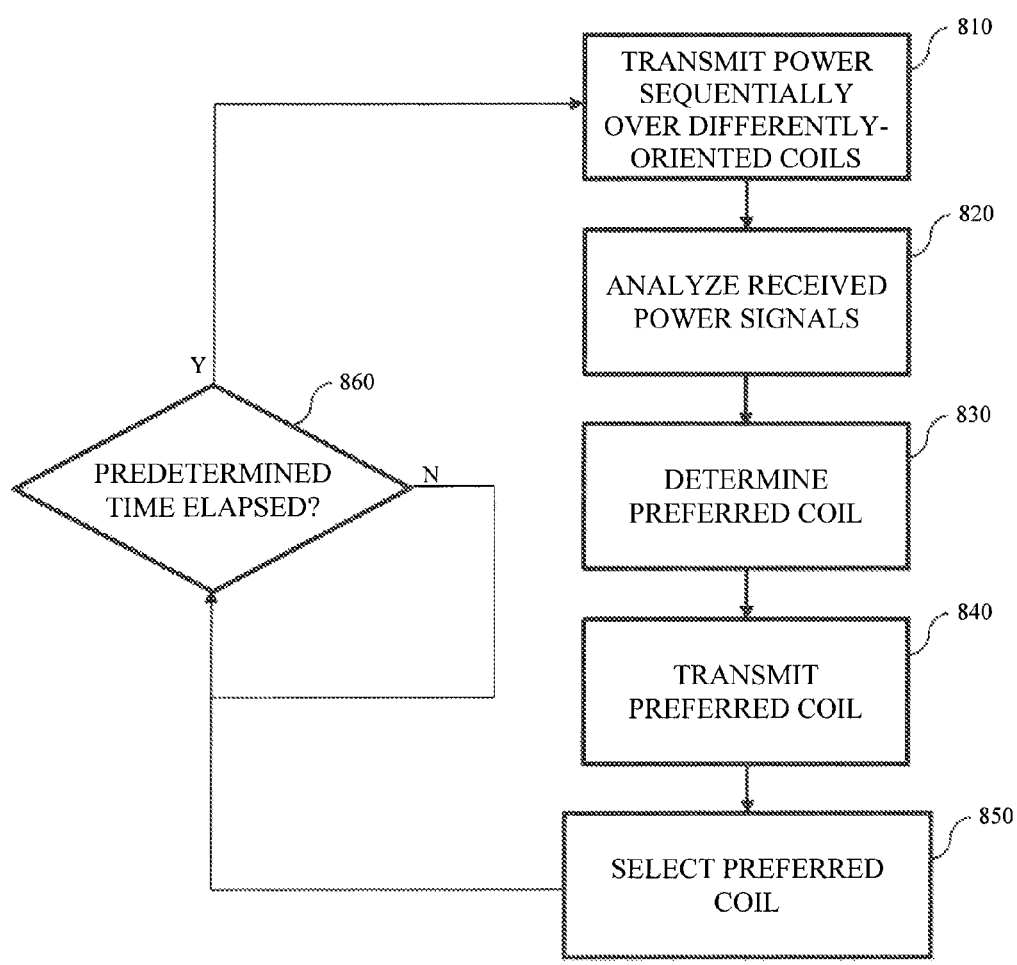
FIG. 8 illustrates a block diagram of a method for optimizing power transfer.

FIG. 8 illustrates a block diagram of a method for optimizing power transfer. After a recipient device is placed in the vicinity of a power transfer device, the power transfer device begins wirelessly transferring power to the recipient device. In doing so, the power transfer device transmits power signals sequentially over a plurality of coils that are each differently oriented (810). As the recipient device receives these signals, the recipient device analyzes the signals and/or the power extracted from those signals (820). From the analysis, the recipient device can select a preferred one of the coils (830). In an embodiment, the preferred coil may correspond to the coil providing the largest signal strength and/or extractable power.

Once the preferred coil has been determined, the recipient device transmits a response signal to the power transfer device that identifies the preferred coil (840). The power transfer device receives and processes the response signal and selects the preferred coil identified therein for power transfer (850). In this manner, the power transfer device can transfer power using a preferred or optimal coil from among the plurality of differently-oriented coils.

After the coil has been selected, the power transfer device can monitor an elapsed time (860). If the elapsed time is less than a predetermined time (860—N), the power transfer device continues to transmit power on the previously-selected coil. On the other, when the elapsed time exceeds the predetermined threshold (860—Y), the power transfer device reinitiates the method to update its selected coil.

Those skilled in the relevant art(s) will recognize that the above method can additionally or alternatively include any of the functionality of the mobile device 200/201/701 discussed above, as well as any of its modifications. Further, the above description of the exemplary method should neither be construed to limit the method nor the description of the mobile device 200/201/701.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 9:
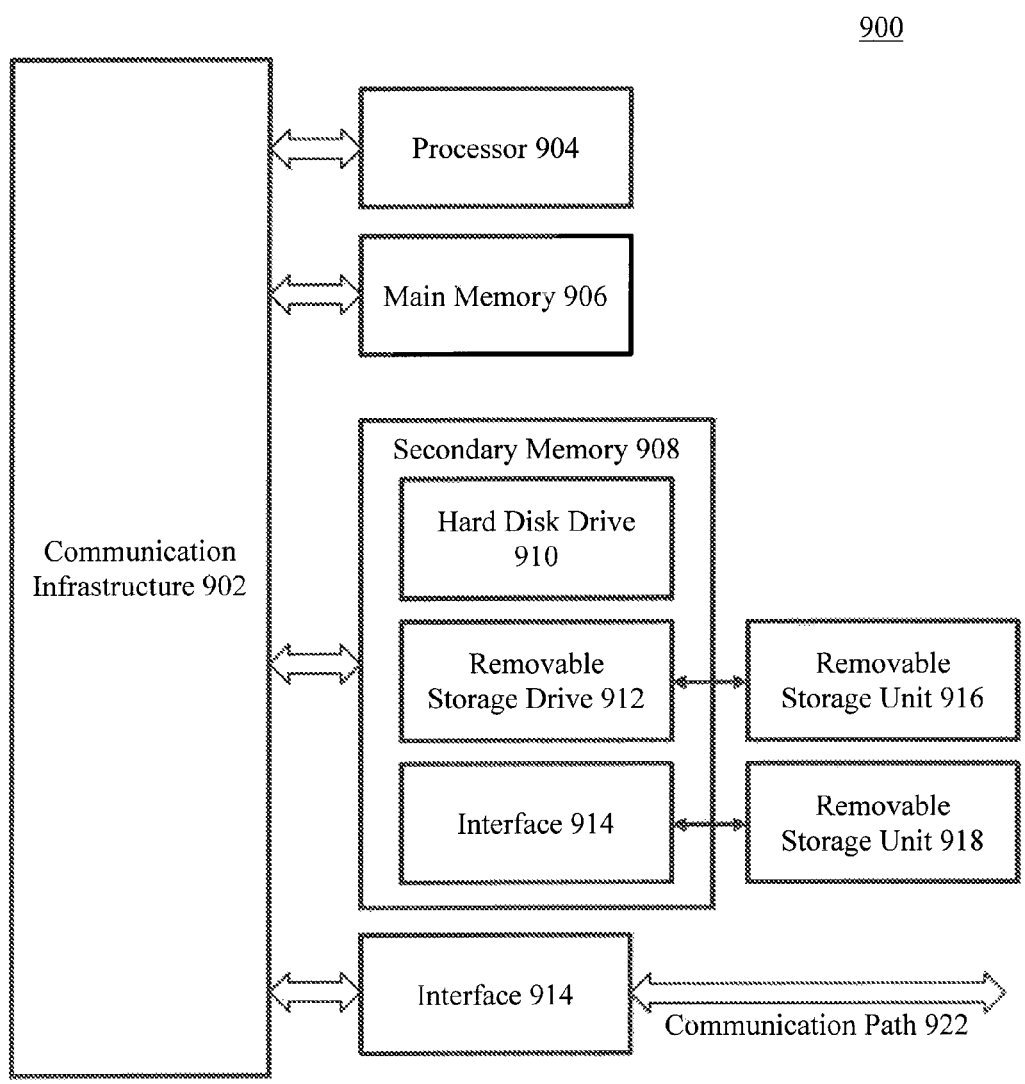
FIG. 9 illustrates a block diagram of an exemplary computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 900 is shown in FIG. 9. One or more of the modules depicted in the previous figures can be implemented by one or more distinct computer systems 900, for example, and including controller module 230, initiation module 220, processor module 330, standard module 310, and billing module 340, among others.

For example, the various controllers, processors, and algorithms described herein can be implemented and or executed by one or more of computer system 900.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCM-CIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A mobile device capable of transferring power to a destination device, the mobile device comprising:
    a power storage module that stores power;
    an initiation module configured to receive initiation information, the initiation information including at least one parameter associated with the destination device;
    a power transmitter module configured to wirelessly transmit power to the destination device, the power transmitter module including:
    a coil module configured to transmit a power transfer signal to the destination device; and
    a load module configured to load the coil module with the power transfer signal;
    a sensor module configured to sense an amount of power transmitted to the destination device based at least on an amount of power change that has occurred within the power storage module during the power transmission; and
    a controller module configured to control the power transmitter module based on the at least one parameter and the amount of power transmitted to the destination device that is sensed by the sensor module.

2. The mobile device of claim 1,
wherein the sensor module is further configured to detect the amount of power transmitted to the destination device as the amount of power removed from the power storage module.

3. The mobile device of claim 1, wherein the sensor module is further configured to detect the amount of power transmitted to the destination device as the amount of power loaded onto the coil module by the load module.

4. The mobile device of claim 1, wherein the at least one parameter includes a desired amount of power to be transferred, and
wherein the controller module receives the amount of power transmitted to the destination device from the sensor module and controls the power transmitter module to transmit power to the destination device until the amount of power transmitted to the destination device is equal to or greater than the desired amount of power to be transmitted.

5. The mobile device of claim 1, further comprising a billing module configured to determine a cost of the power transmitted to the destination device.

6. The mobile device of claim 5, wherein the billing module is configured to receive, from the sensor module, the amount of power transmitted to the destination device, and
wherein the billing module is configured to calculate the cost based on the amount of power transmitted to the destination device and a cost of power.

7. The mobile device of claim 6, wherein the billing module is configured to receive the cost of power from a wireless network.

8. A power transfer device, comprising:
a power storage module that stores electrical power;
a power transmitter module configured to wirelessly transmit power from the power storage module to a destination device;
a sensor module configured to sense an amount of power transmitted to the destination device based at least on a change in an amount of electrical power stored in the power storage module that has occurred during the power transmission; and
a controller module configured to control the power transmitter module based on the sensed amount of power transmitted to the destination device.

9. The power transfer device of claim 8, wherein the controller module is configured to receive a parameter indicating a desired amount of power to be transferred to the destination device, and
wherein the controller module controls the power transmitter module to stop transmitting power to the destination device based on the amount of power transmitted to the destination device sensed by the sensor module and the parameter.

10. The power transfer device of claim 9, further comprising a billing module configured to determine a cost of the power transmitted to the destination device.

11. The power transfer device of claim 10, further comprising a communication module configured to receive billing information from the destination device.

12. The power transfer device of claim 11, wherein the billing information includes a payment amount and information sufficient to facilitate a transfer of funds from a user of the destination device to a user of the power transfer device.

13. The power transfer device of claim 12, wherein the controller module is configured to control the power transmitter module to transmit power to the destination device only after the billing information has been received and authenticated, and
wherein the controller module is configured to control the power transmitter to stop transmitting power to the destination device when the cost of the power transmitted to the destination device is equal to the payment amount.

14. The power transfer device of claim 13, wherein after the controller module has controlled the power transmitter module to stop transmitting power to the destination device, the billing module initiates a transfer of funds from the user of the destination device to the user of the power transfer device using the billing information.

15. A mobile device capable of wirelessly transferring power to a destination device, the mobile device comprising:
a wireless communication receiver configured to receive initiation information from the destination device, the initiation information including a plurality of configuration parameters;
a power storage module that stores electrical power;
a power transmitter configured to transmit power to the destination device from the power storage module;
a sensor configured to detect an amount of power transmitted to the destination device based on an amount of change in the electrical power stored in the power storage module; and
a controller configured to control the power transmitter based on the plurality of configuration parameters and the detected amount of power transmitted,
wherein the plurality of configuration parameters includes an amount of power to be transmitted.

16. The mobile device of claim 15, wherein the plurality of configuration parameters includes a direction of power transfer, an amount of power requested, and a power transfer standard.

17. The mobile device of claim 15, wherein the control of the power transmitter includes stopping of power transmission.

* * * * *